(12) United States Patent
Chang

(10) Patent No.: US 6,360,034 B1
(45) Date of Patent: Mar. 19, 2002

(54) REFLECTION BASED NONMOVING PART OPTICAL SWITCH

(75) Inventor: Kok Wai Chang, Sunnyvale, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/475,715

(22) Filed: Dec. 30, 1999

(51) Int. Cl.[7] ................ G02B 6/26; G02B 6/42
(52) U.S. Cl. ............. 385/18; 385/11; 385/16; 385/17; 385/20; 385/21; 372/703
(58) Field of Search ............. 385/20, 21, 17, 385/11, 16, 18, 19; 372/703

(56) References Cited

U.S. PATENT DOCUMENTS

| | | | | |
|---|---|---|---|---|
| 5,499,132 A | * | 3/1996 | Tojo | 385/11 |
| 5,694,233 A | | 12/1997 | Wu et al. | 359/117 |
| 5,724,165 A | | 3/1998 | Wu | 359/117 |
| 5,734,763 A | | 3/1998 | Chang | 385/11 |
| 5,982,539 A | * | 11/1999 | Shirasaki | 385/11 |
| 6,154,583 A | * | 11/2000 | Kuroyanagi | 385/16 |
| 6,226,115 B1 | * | 5/2001 | Shirasaki | 385/11 |
| 6,310,989 B1 | * | 10/2001 | Liu | 385/11 |

* cited by examiner

*Primary Examiner*—Darren Schuberg
*Assistant Examiner*—Leo Boutsikaris
(74) *Attorney, Agent, or Firm*—Lacasse & Associates; Randy W. Lacasse; Kevin E. Greene

(57) ABSTRACT

Multiple N×M and M×N optical switchers that may be combined within a single package to produce an N×N optical switch, where M is greater than N. The use of multiple optical switchers within an optical switch package allows for a higher degree of isolation than may be achieved than with a single stage optical switch. The optical switchers may be reflection type devices having no moving parts. The optical switchers may include a magneto-optic Faraday rotator having a thin crystal that is easy to grow and consumes less space, thereby enabling a smaller, less expensive, and less complex optical switch.

10 Claims, 4 Drawing Sheets

REFLECTION BASED NONMOVING PART OPTICAL SWITCH

FIELD OF THE INVENTION

This invention relates to the field of fiber optics and, more specifically, to optical switches.

BACKGROUND

Switches are used in networks to redirect signals along different pathways of a network, thereby enabling networks to adapt to changing conditions. One such changing condition may be to direct signals around a break in an optical fiber. Fiber optic networks typically have more than one path to a particular destination so that, if a fiber breaks, the light signals may be redirect through a second path. Another condition may be to make a temporary point-to-point connection through the network, as might be performed during data transfer.

Regardless of the condition, switching may be performed electrically or optically depending on the particular hardware that is used. However, once signals are converted into optical form, network designers may prefer to maintain the signals in optical form until they reach their destination to reduce system costs and complexity. As such, as transmission rates increase, the need for efficient optical switches continues to grow.

Some optical switches are manufactured using discrete optical elements that may be bulky and expensive. A substantial portion of the cost of making such optical switches arises because the discrete optical elements are physically large and have to be individually and precisely aligned relative to one another. The large size of these components may limit the density with which optical fiber switching systems can be built.

In one type of optical switch, the switching operation is effectuated by moving an input fiber relative to the ends of a group of output fibers that are positioned opposite to the input fiber. To form an optical path, a motor is used to move the end of the input fiber until it is aligned with the end of a selected fiber from the group of output fibers. This type of optical switch is a transmission based device having optical components positioned in series between the input and output fibers. The optical switch includes a lens that is used to focus light from the input fiber to an output fiber.

One problem with a transmission based optical switch is that it requires a large number of optical components to couple light between input and output fibers. The use of a large number of optical components increases the overall length of the optical switch, thereby undesirably adding to its size.

One problem with an optical switch that uses a motor is that it has a slow switching speed and consumes large amounts of power to move the end of the single optical fiber across the entire width of the group of single fibers. Another problem is that the width of the optical components must be large enough to couple light between the input fiber and the entire group of output fibers. For example, the lens within the optical switch must be large enough to cover the area in front of the entire group of output fibers. Increasing the length and the width of an optical switch adds to its overall size, thereby decreasing its desirability.

Another type of optical switch includes a Faraday rotator as one of the optical components that are used to selectively couple light between input and output fibers. The Faraday rotator that is used rotates the plane of polarization of light passed through it by 45 degrees. One problem with a 45 degree Faraday rotator is that it is a thick optical element whose use may add to the overall length of the optical switch. The added length may decrease the desirability of such an optical switch.

Yet another type of optical switch uses a single stage to switch light signals between fibers. One problem with single stage switches is that their use may not achieve the degree of isolation required in current optical networks.

SUMMARY OF THE INVENTION

The present invention pertains to an optical switch having a plurality of N×M optical switchers and a plurality of M×N optical switchers coupled to the plurality of M×N optical switchers to produce an N×N optical switch. M being greater than N and N being greater than 1.

In one embodiment, the optical switchers may have no moving parts and may include a variable magneto-optic rotator that rotates the planes of polarization of light by approximately 22.5 degrees.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which.

DETAILED DESCRIPTION

In the following description, numerous specific details are set forth such as examples of specific materials, components, dimensions, etc. in order to provide a thorough understanding of the present invention. It will be apparent, however, to one skilled in the art that these specific details need not be employed to practice the present invention. In other instances, well known materials or components have not been described in detail in order to avoid unnecessarily obscuring the present invention.

An apparatus is described herein for directing light signals between various ports of an optical switch. In one embodiment, multiple N×M and M×N optical switches may be combined within a single package to produce an N×N optical switch, where M is greater than N. The N×M, M×N, and N×N designations refer to the number of inputs and outputs of an optical switch, respectively. For example, a 1×2, or 1 by 2, optical switch refers to an optical switch with 1 input port and two output ports. The use of multiple optical switchers within an optical switch package may allow for a higher degree of isolation than may be achieved than with a single stage optical switch.

In one embodiment, the optical switchers may be reflection based devices having no moving parts. In another embodiment, the optical switchers may include a thin crystal rotator that is easy to grow and consumes less space, thereby enabling a smaller, less expensive, and less complex optical switch.

Figure 1:
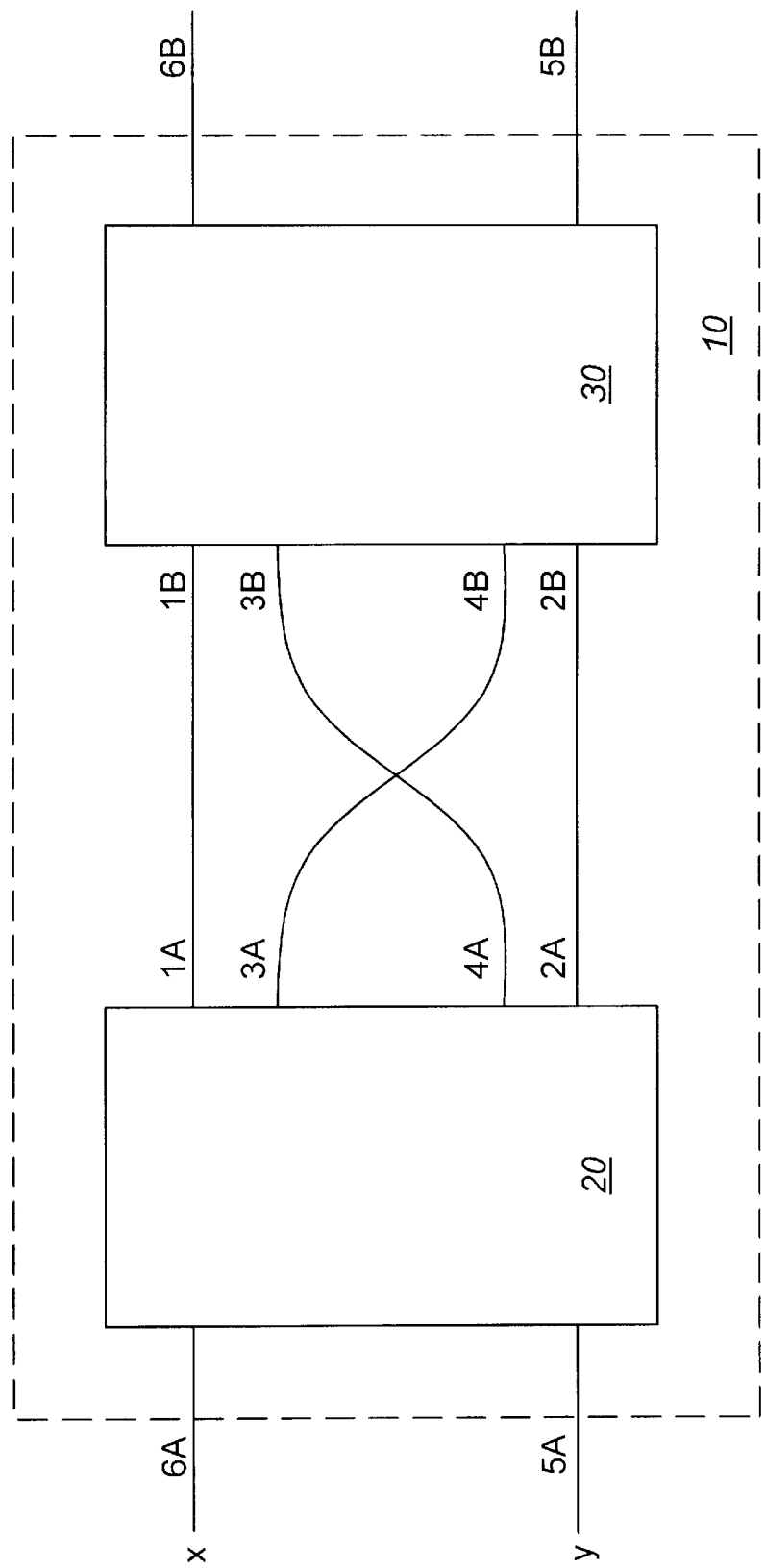
FIG. 1 illustrates one embodiment of an optical switch.

FIG. 1 illustrates one embodiment of an optical switch. In one embodiment, two 2×4 optical switchers 20 and 30 may be combined within a single package to produce a 2×2 optical switch 10. The optical switchers 20 and 30 may further be made of optical switchers having a fewer number of ports, for example, 1×2 optical switchers. In an alternative embodiment, optical switch 10 may have other configurations of optical switchers and may have more or less than four ports.

In one embodiment, optical switch 10 receives two light beams X and Y on input ports 6A and 5A, respectively, and outputs the light beams on output ports 6B and 5B based on the configuration of an optical element within optical switch 10. The configuration of the optical element that controls the direction of light beams X and Y is discussed below in relation to FIG. 4.

The optical switch 10 may include a first stage optical switcher 20 and second stage optical switcher 30, with each switcher having 6 ports. The ports 1A, 3A, 4A, and 2A of the first stage optical switcher 20 are coupled to the ports 1B, 3B, 4B, and 2B, respectively, of the second stage optical switcher 30. Based on the configuration of optical components within the optical switchers 20 and 30, light beam X may be propagated to either one of output ports 6B and 5B, and light beam Y may be propagated to the other one of output ports 6B and 5B. By using a dual stage optical switch, a high degree of isolation may be achieved as discussed below.

Optical switch 10 operates to propagate light from an input port to an output port with a low amount of total attenuation, while isolating the propagation of light in the reverse direction. Attenuation measures the amount of light lost between inputs and outputs of the optical switchers within optical switch 10. Such attention may limit how far a signal may travel through a network before it becomes too weak to detect.

Total attenuation is the sum of all losses through optical switch 10. Total attenuation may be contributed to by factors such as imperfect light coupling to a port, absorption, and scattering at component connections. The attenuation of an optical switch may be defined as the ratio of input to output power between ports. Attenuation is typically measured in decibels (dB) and may be approximated by the following equation:

$$dB(\text{attenuation}) = 10\log_{10}\left(\frac{P_{out}}{P_{in}}\right)$$

where $P_{out}$ is the output power and $P_{in}$ is the input power.

The percentage of light isolated by an optical switch may be correlated with the above equation. For example, 3 dB isolation leaves approximately half of the original light. Whereas, a 20 dB isolation allows approximately 1% of light to be reflected back through the optical switch. If, for example, optical switcher 20 provides 20 dB of isolation in the first stage and optical switcher 30 provides 20 dB of isolation in the second stage, then optical switch 10 may provide approximately 40 dB of isolation.

Figure 2B:
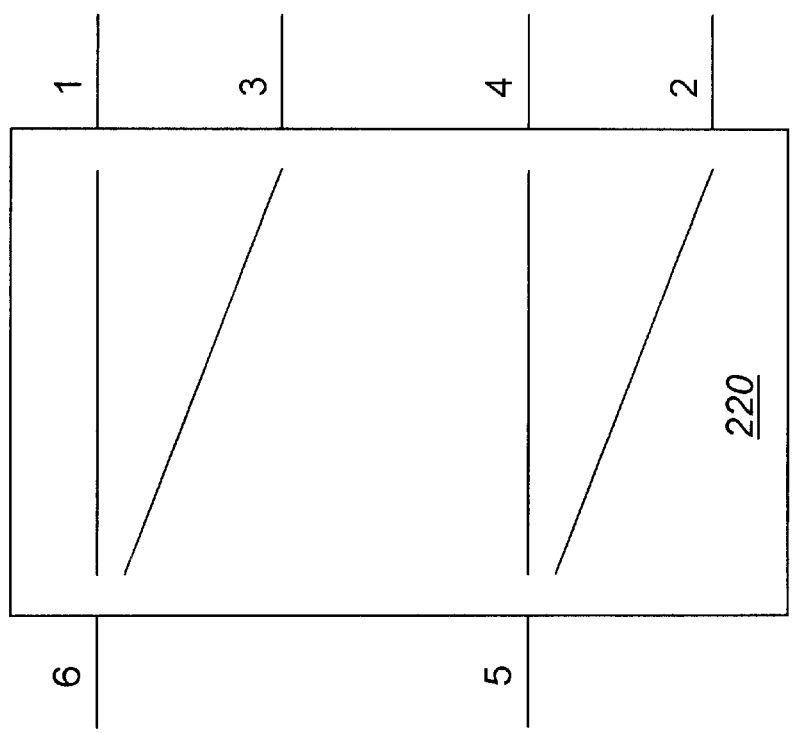
FIG. 2B illustrates an alternative embodiment of an optical switch stage.
Figure 2A:
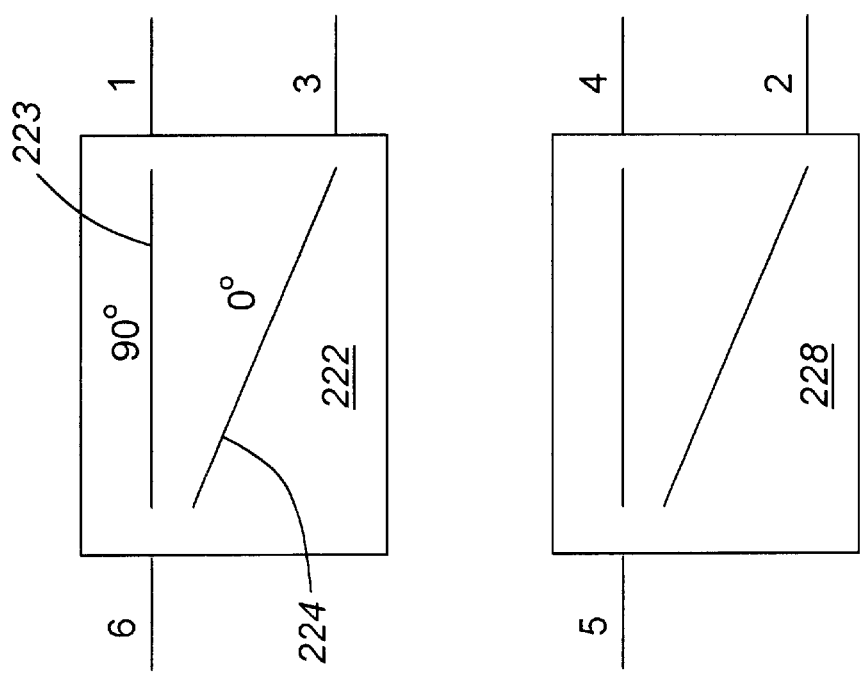
FIG. 2A illustrates one embodiment of an optical switch stage.

FIGS. 2A and 2B illustrate different embodiments of an optical switch stage. In one embodiment, for example, optical switch 20 of FIG. 1 may include two 1×2 optical switchers 222 and 228. Optical switchers 222 and 228 may include optical elements to propagate light from port 6 to either of ports 1 or 3 based the configuration of an optical element contained therein, as discussed below in relation to FIG. 4. In one embodiment, for example, when an optical element within optical switcher 222 is configured to rotate the polarization of light by 90 degrees, configuration 223, light from port 6 is propagated to port 1. When the optical element is configured to rotate the polarization of light by zero degrees, configuration 224, light from port 6 is propagated to port 3.

In an alternative embodiment, the first stage optical switch 20 of FIG. 1 may include a 2×4 optical switch 220 having 6 ports. Optical switch 220 operates to propagate light between port 6 and a selected one of ports 1 and 3. Optical switch 220 also operates to propagate light between port 5 and a selected one of ports 4 and 2. The selection may be performed similar to that discussed in relation to optical switcher 222.

The operation of the optical switchers of FIGS. 1, 2A, and 2B are conceptually illustrated by the figures. FIGS. 1, 2A, and 2B are intended only to illustrate the functional relationship between input and output ports of optical switchers and not necessarily the physical relationship between them. In one embodiment, all of the input and output ports of an optical switcher may be aligned together along a single side of the optical switcher. This type of configuration allows for the use of one or more multiple core fibers to be coupled to optical switchers 10 and 20. In one embodiment, for example, two multiple core fibers, each having three cores, may be coupled to the ports of optical switcher 220 of FIG. 2B. In an alternate embodiment, the optical switchers of FIGS. 1, 2A, and 2B may be coupled to single core fibers.

In one embodiment, fibers having thermally expanded cores may be used. Thermally expanded core fibers have cores spaced close together with expanded mode field diameters. The close spacing between the cores of such a fiber may reduce the angle of reflection of light when used with a reflection based optical switch as discussed below. A reduced angle of reflection allows for a smaller area of coverage by the optical switch's optical elements, thereby reducing the size of the optical switch.

The expanded mode field diameters of the cores may also reduce the amount of divergent light emitted from the cores, thereby improving the efficiency of light coupling between an input core and an output core. In addition, by reducing the amount of divergent light emitted from the cores, the need for lenses to collimate light between the thermally expanded cores and the optical switch may be eliminated.

Figure 3:
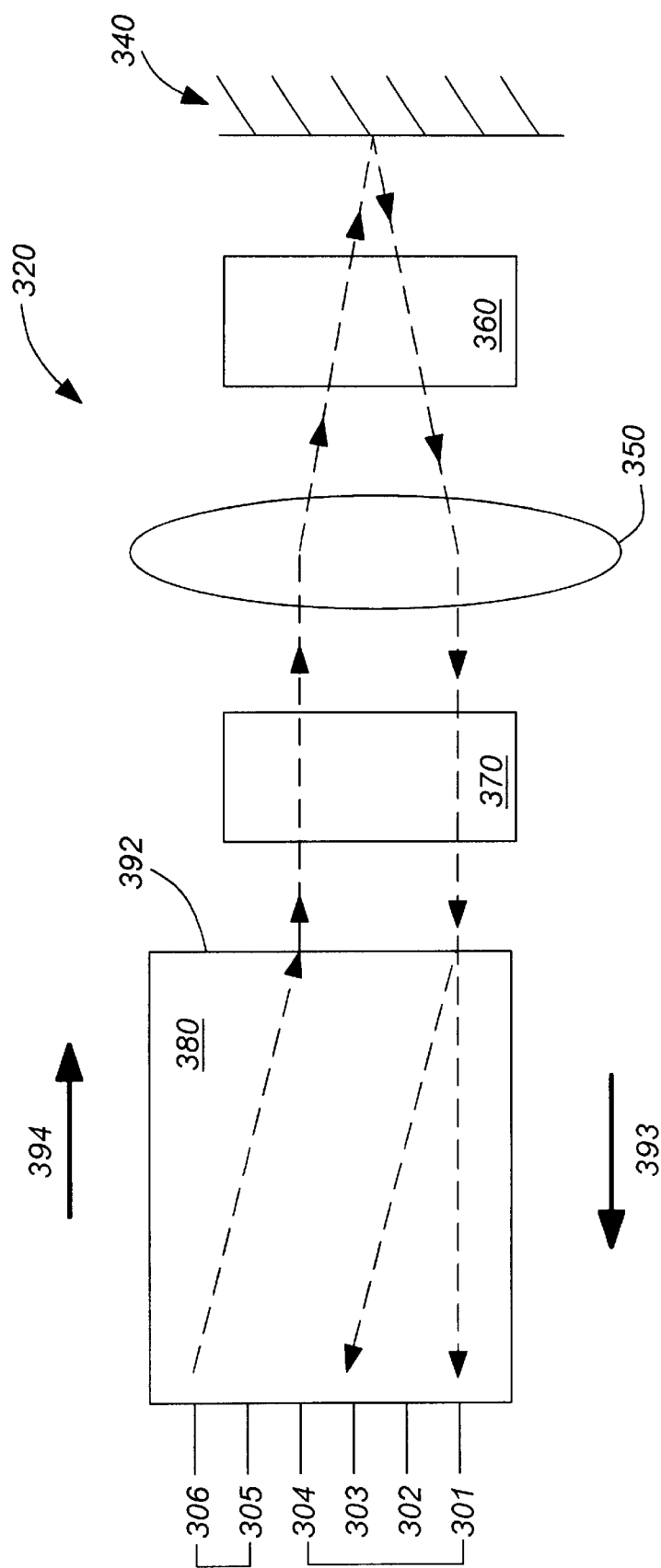
FIG. 3 illustrates one embodiment of an optical switcher.

FIG. 3 illustrates one embodiment of an optical switch. In one embodiment, optical switch 320 may be a 2×4 optical switch having optical ports 301–306. Optical ports 306 and 305 may be input ports and optical ports 301–304 may be output ports. The optical switch 320 includes components to propagate signals from input ports 305–306 to output ports 301–304 while inhibiting propagation of, or isolating signals from output ports 301–304 to input ports 305–306. This isolation is intended to prevent unwanted signal reflections from being transmitted back to a signal's source. The isolation may be achieved through the separation, rotation, and recombination of orthogonally polarized light.

In one embodiment, optical switch 320 may include a crystal stack 380, a first rotator 370, a lens 350, a second rotator 360, and a mirror 340. Crystal stack 380 operates to position certain polarization components of light from inputs 305 and 306 at a particular location on its end face 392 when passed through in forward direction 394. Light from inputs 305 and 306 is then propagated through rotators 370, 360 and lens 350 to end face 392.

The lens 350 and mirror 340 operate to adjust the position the light from input 6 such that it is moved to a location on end face 392 that will allow it to be coupled to either output 1 or 3 when passed through crystal stack 380 in reverse direction 393. Lens 350 and mirror 340 operate to adjust the position of light about their optic axis. The operation of a lens and a mirror are well known in the art; accordingly, a more detailed description is not provided.

Whether light from input 6 is propagated to output 1 or 3 is based on the orientation of its polarization components when passed through in reverse direction 393. The orientation is determined by the configuration of rotator 360 in relation to rotator 370. When rotator 360 is configured to rotate light in the same direction as rotator 370, light from input 6 has a polarization orientation that enables it to propagate to output 1 when traveling in reverse direction 393. When rotator 360 is configured to rotate light in the opposite direction as rotator 370, light from input 6 has a polarization orientation that enables it to propagate to output 3 when traveling in reverse direction 393. Whether light from input 5 is propagated to output 2 or 4 is similarly based on the configuration of rotator 360 in relation to rotator 370.

Figure 4:
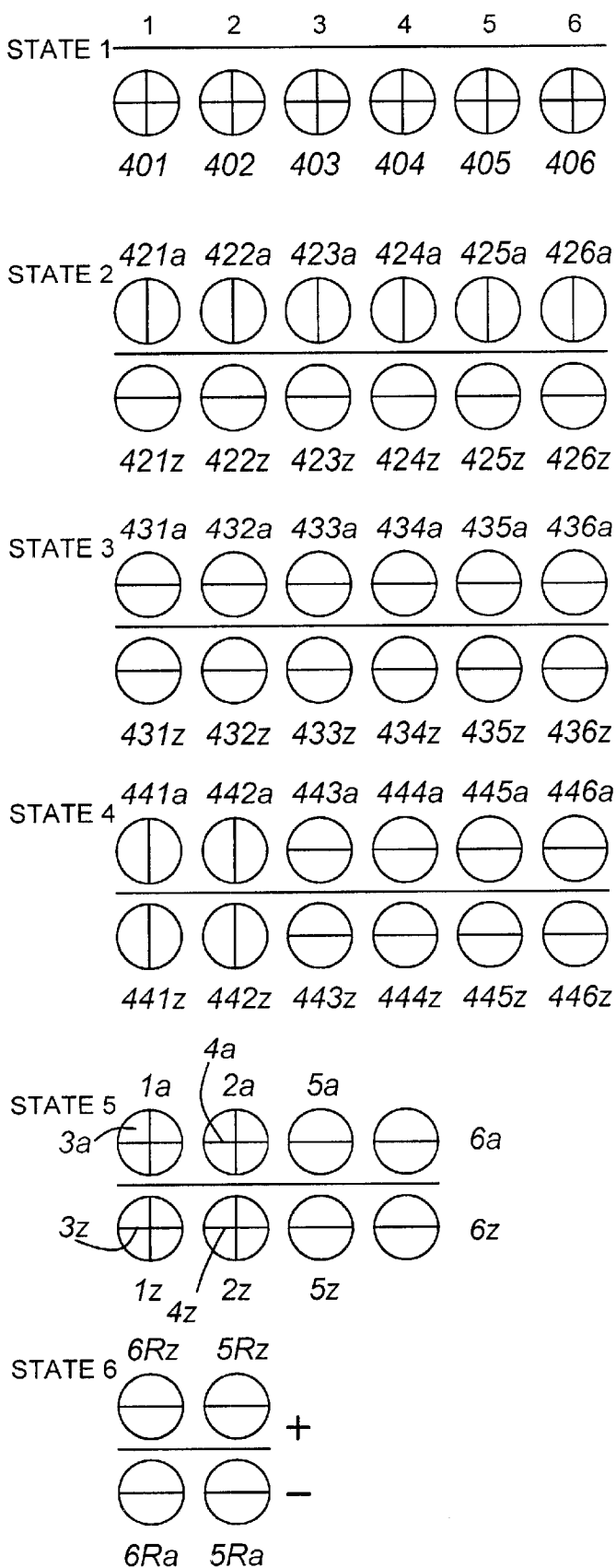
FIG. 4 illustrates the polarization of light beams as they propagate through one embodiment of a crystal stack.
Figure 4:
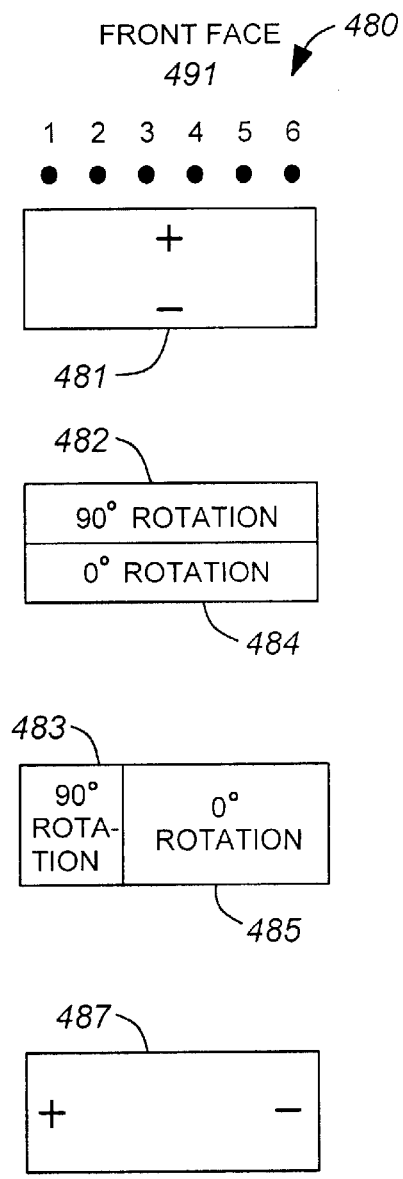

FIG. 4 illustrates the polarization of light beams as they propagate through one embodiment of a crystal stack. An exploded cross-sectional view of crystal stack 480 components is shown in FIG. 4 for the ease of describing the polarization of light propagating through the components. In one embodiment, crystal stack 481 may be crystal stack 380 of FIG. 3. As detailed below, light propagated through crystal stack 480 beginning at positions 1–6 on the front face 491 would end up at the positions 1a,z through 6a,z, respectively, shown in state 5, on end face 492. Because crystal stack 480 is a reciprocal device, if light is incident on end face 492 (received, for example, from rotator 370 of FIG. 3) at the positions shown by state 5, the light would propagate through crystal stack 480 to the positions shown at state 1.

In one embodiment, for example, state 6 represents the position of light beams reflect from mirror 340 of FIG. 3 on end face 492 of crystal stack 480. State 6 shows light beam polarization components 5Ra, 5Rz and 6Ra, 6Rz incident on end face 492. Light beam polarization components 5Rz and 5Ra are incident on end face 492 in the same positions referenced as 4a and 4z, respectively, of state 5. As such, light beam polarization components 5Rz and 5Ra would propagate back through (and combined by) crystal stack 480 to position 4 on front face 491.

If light beam polarization components 5Rz and 5Ra are rotated 90 degrees with respect to their orientation shown in state 6, then they would be incident on end face 492 in the same positions referenced as 2a and 2z, respectively, of state 5. In this orientation, the light beam polarization components would propagate back through (and combined by) crystal stack 480 to position 2 on front face 491.

Thus, by using lens 350 and mirror 340 of FIG. 3, the light beam polarization components 5a and 5z of state 5 exiting the crystal stack (originally propagated from port 5) may be reflected back to the crystal stack at the positions of polarization components 5Rz and 5Ra of state 6. Light beams incident on end face 492 of crystal stack 480 at the positions of polarization components 5Rz and 5Ra will propagate through (and be combined by) the crystal stack to either position 2 or 4 on front face 491, depending on the orientation of the polarization components at end face 492.

In this manner, light from port 5 may be coupled to either port 2 or port 4 by using rotators 370 and 360 of FIG. 3 to control the orientation of the polarization components reflected back to the crystal stack. In a similar manner, light from port 6 may be coupled to either port 1 or port 3 of FIG. 3.

In addition, the use of walk-off crystals within crystal stack 380 allows light from ports 305 and 306 to be diverted to a position superimposed with the positions of light from ports 301–304. This means that a smaller area is require to be covered by lens 350. This may simplify the design of lens 350 and reduce its size, thereby, enabling the manufacture of a smaller and cheaper optical switch.

Referring back to FIG. 4, the operation of the components within crystal stack 480 will now be discussed. In one embodiment, crystal stack 480 includes a walk-off crystals 481 and 487, rotators 482–483, and spacers 484–485. Walk-off crystals 481 and 487 are crystals of birefringent material that split an unpolarized light beam into two orthogonally polarized light beams. When an anisotropic (birefringent) crystal is cut at a certain angle relative to its optical axis, the crystal will cause a component of light in a particular polarization direction to be diverted into a different path as it passes through the crystal. The amount of divergence is proportional to the thickness of the crystal. The direction that the polarization component is diverted is referred to as the walk-off direction of the crystal.

A birefringent crystal, however, will only divert the polarization component in a polarization plane parallel to the walk-off direction and will not effect the polarization component in a plane perpendicular to the walk-off direction. In addition, a walk-off crystal is a reciprocal device such that the divergence of light passed through the crystal in a forward direction is opposite that of light passed through the crystal in a backward direction. Furthermore, two orthogonally polarized light beams are recombined into a single light beam when passed through a walk-off crystal.

The walk-off direction for crystals 481 and 487 is shown by (+) and (−) symbols for one embodiment. The walk-off direction for light traveling in the forward direction (from state 1 to state 5) is from (−) to (+). For light travel in the reverse direction, the walk-off direction is from (+) to (−).

In one embodiment, walk-off crystals 481 and 487 are constructed from a birefringent crystal having a high index of refraction, for example, rutile ($TiO_2$). The birefringent crystal divides an entering unpolarized light beam into two components referred to as an ordinary ray and an extraordinary ray. Rutile has an index of refraction for the ordinary ray ($n_o$) of 2.451 and an index of refraction for the extraordinary ray ($n_e$) of 2.709 at 1550 nanometer (nm) wavelength light.

In another embodiment, walk-off crystals 481 and 487 are constructed from other birefringent materials, for examples, calcite ($CaCO_3$) and yttrium vanadate ($YVO_4$). Yttrium vanadate, for example, has an index of refraction for the ordinary ray ($n_o$) of 2.1486 and an index of refraction for the extraordinary ray ($n_e$) of 1.9447 at 1550 nm wavelength light. By using a crystal with a high index of refraction, the angular divergence of light exiting the optical isolator may be reduced. In one embodiment, walk-off crystals 481 and 487 are constructed from the same material. In another embodiment, walk-off crystals 481 and 487 may be constructed of different materials.

Rotators 482 and 483 operate to rotate the plane of polarization of light passed through it. In one embodiment, rotators 482 and 483 are half-wave plates. A half-wave plate is a reciprocal device that rotates the plane of polarization of light based on the direction which light is passed through it. The degree of rotation is determined by the acute angle between the half-wave plate's optic axis direction and the polarization plane of linearly polarized incident light. A half-wave plate rotates the polarization plane through an angle that is twice the acute angle. In one embodiment, rotators 482 and 483 have their optic axis oriented to provide approximately 90 degrees rotation of light passed through in a forward direction and approximately negative 90 degrees rotation of light passed through in a backward direction.

Spacers 484 and 485 are isotropic crystals having a refractive index similar to rotators 482 and 483. Spacer crystals 484 and 485 are used to maintain the propagation of light between walk-off crystals 481 and 487 without rotating the polarization components of the light beams propagated between them. In one embodiment, spacer crystals 484 and 485 are half-wave plates with their optic axes oriented to provide zero degrees of polarization rotation.

Walk-off crystals, spacers, and half-wave plates are well known in the art; accordingly, a more detailed description of their internal composition and their operation is not provided.

The light beams 401–406, at state 1, each include polarization components "a" and "b." Light beams 401–406 incident on walk-off crystal 481 are each split into two orthogonally polarized components, 421$a,z$ through 426$a,z$, respectively, by walk-off crystal 481. At state 2, light beams 421$z$–426$z$ are polarized perpendicular to the walk-off direction of crystal 481. Polarization components 421$a$–426$a$ are polarized in a plane that is parallel to the walk-off direction of crystal 481 and is offset from polarization components 421$z$–426$z$ by a distance proportional to the thickness of crystal 481. The thickness of crystal 481 is selected to divert the polarization components such that the no overlap will result between the diverted and the non-diverted beams.

Rotator 482 is positioned to receive polarization components 421$a$–426$a$ and spacer 484 is positioned to receive polarization components 421$z$–426$z$. In one embodiment, rotator 482 rotates the planes of polarization of polarization components 421$a$–426$a$ by approximately 90 degrees resulting in polarization components 431$a$–436$a$, respectively, shown in state 3. Spacer 484 has no effect on the polarization orientation of polarization components 421$z$–426$z$, resulting in polarization components 431$z$–436$z$, respectively, as shown by state 4.

Rotator 483 is positioned to receive polarization components 431$a$–432$a$ and 431$z$–432$z$. In one embodiment, rotator 483 rotates the planes of polarization of polarization components 431$a$–432$a$ and 431$z$–432$z$ by approximately 90 degrees resulting in polarization components 441$a$–442$a$ and 441$z$–442$z$, respectively. Spacer 485 is positioned to receive polarization components 433$a$–436$a$ and 433$z$–436$z$. Spacer 485 has no effect on the polarization orientation of polarization components 433$a$–436$a$ and 433$z$–436$z$, resulting in polarization components 443$a$–446$a$ and 443$z$–446$z$, respectively, as shown by state 4.

Walk-off crystal 487 is positioned to receive polarization components 441$a$–446$a$ and 441$z$–446$z$. Because polarization components 443$a$–446$a$ and 443$z$–446$z$ are oriented parallel to the walk-off direction of walk-off crystal 487, they will be diverted by the walk-off crystal in the direction from (−) to (+) as indicated in FIG. 4. Polarization components 441$a$–442$a$ and 441$z$–442$z$ will not be diverted by walk-off crystal 487 because they are not oriented parallel to the walk-off direction. Rather, polarization components 441$a$–442$a$ and 441$z$–442$z$ are oriented perpendicular to the walk-off direction of walk-off crystal 487.

In one embodiment, the thickness of walk-off crystal 487 is selected such that it diverts polarization components 443$a$–446$a$ and 443$z$–446$z$ by a distance equal to twice the space between polarization components. This results in the positions shown by state 5.

Referring back to FIG. 3, as previously discussed, rotators 360 and 370 of FIG. 3 may be used to adjust the polarization orientation of light in order to selectively couple light, for example, from input 5 to either port 2 or port 4.

In one embodiment, rotator 370 is a Faraday rotator that rotates the plane of polarization of light passed through it by approximately 22.5 degrees. The Faraday rotator may use, for example, a permanent magnet or a latching garnet to set the degree of rotation. A Faraday rotator is a non-reciprocal device that rotates the plane of polarization of light in the same direction when light is passed through it in either direction. It should be noted that even though Faraday rotators are set to perform a certain rotation at a certain temperature and wavelength of light, slight variations in both temperature and wavelength may introduce an error angle resulting in minor components of light beams at other polarization angles, referred to as leakage. Although, these minor components may not be completely isolated, only the major components of the polarized light beams are discussed herein.

In one embodiment, rotator 360 is a variable Faraday rotator that rotates the plane of polarization of light passed through it by either approximately 22.5 degrees or negative 22.5 degrees (with respect to the rotation of light by rotator 370). A variable Faraday rotator uses magnetic coils (not shown) to provide a magnetic field that controls the degree of rotation. The magnetic field may be electrically varied to switch the Faraday rotator from approximately 22.5 degrees to approximately negative 22.5 degrees. Because optical switcher 320 is reflection based, the magnetic coils may be place behind mirror 340. The placement of magnetic coils in-line with other components of the optical switcher may allow for the use of a thinner package.

If rotators 370 and 360 are each configured to rotate the plane of polarization of light by approximately 22.5 degrees, then light propagate from crystal stack 380 will be reflect back to the crystal stack with its plane of polarization rotated by approximately 90 degrees. If rotators 370 and 360 are configured to rotate the plane of polarization of light by approximately 22.5 degrees and −22.5 degrees, respectively, then light propagate from crystal stack 380 will be reflected back to the crystal stack with its plane of polarization rotated by approximately 0 degrees. By reflecting light back to crystal stack 380 with either no rotation or 90 degrees of rotation, the light may be selectively coupled to either one of two ports using crystal stack 380, as discussed above in relation to FIG. 4. A Faraday rotator configured to rotate the plane of polarization of light by approximately 22.5 degrees uses thinner crystals than those that rotate the plane of polarization of light by greater degrees, for example, 45 degrees. Such thinner crystals are easier to grow and consume less space, thereby enabling a smaller, less expensive, and less complex optical switch.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An optical switch comprising:
   an N×M optical switcher providing a first isolation;
   an M×N optical switcher coupled to the N×M optical switcher providing a second isolation, wherein M is greater than N and N is greater than 1, and wherein the total isolation of the switch is greater than either the first or second isolation; each of the N×M and M×N optical switchers further comprising:

a crystal stack;
a first rotator optically coupled to the crystal stack;
a lens optically coupled to the first rotator;
a second rotator optically coupled to the lens; and
a mirror optically coupled to the second rotator, such that light can be switched from a selected N input port to a selected N output port without moving parts.

2. The optical switch of claim 1, wherein the second rotator rotates the planes of polarization of light by approximately 22.5 degrees.

3. The optical switch of claim 2, wherein the second rotator is a variable Faraday rotator.

4. The optical switch of claim 2, wherein the second rotator has magnetic coils and wherein the mirror is coupled in between the second rotator and the magnetic coils.

5. The optical switch of claim 3, wherein the N×M optical switcher is a 2×4 optical switcher and the M×N optical switcher is a 4×2 optical switcher.

6. The optical switch of claim 1, wherein the first isolation is approximately 20 dB, the second isolation is approximately 20 dB, and the total isolation is approximately 40 dB.

7. An optical switch comprising:
at least one input port;
a plurality of output ports optically coupled to the at least one input port through a switcher comprising:
a crystal stack;
a first rotator optically coupled to the crystal stack;
a lens optically coupled to the first rotator;
a second rotator optically coupled to the lens; and
a mirror optically coupled to the second rotator, wherein at least one of the first and the second rotators comprises a variable rotator, adjustable to selectively rotate the planes of polarization of light, to switch light from an input port to one of the plurality of output ports.

8. The optical switch of claim 7, wherein the variable rotator is adjustable to selectively rotate the planes of polarization of light by either approximately 22.5 degrees or approximately negative 22.5 degrees.

9. The optical switch of claim 7, wherein the at least one input port and the plurality of output ports are coupled to the crystal stack, the plurality of ports having a first area, the lens having a second area less than the first area.

10. The optical switch of claim 8, wherein the variable rotator is a magneto-optic variable Faraday rotator.

* * * * *